Dec. 8, 1925.

L. BLACKMORE 1,564,514

WINDSHIELD CLEANER

Filed Jan. 12, 1923    2 Sheets-Sheet 1

Inventor
Lloyd Blackmore

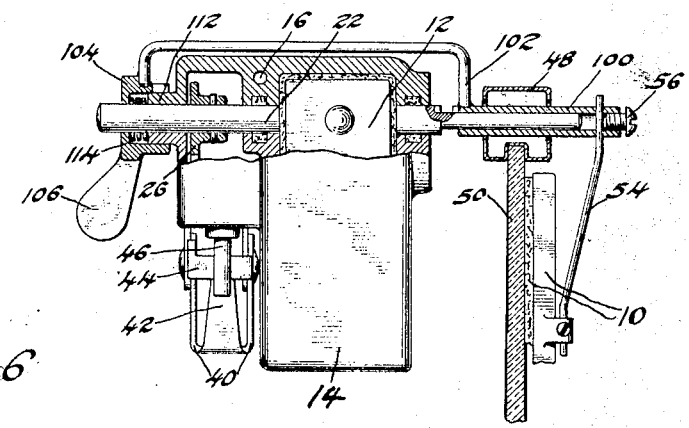
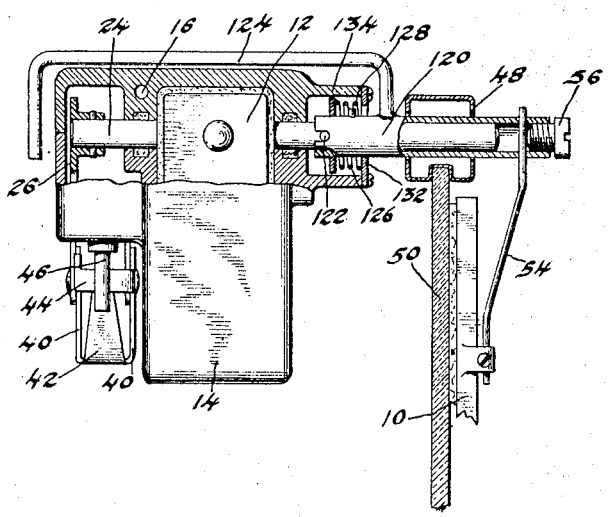
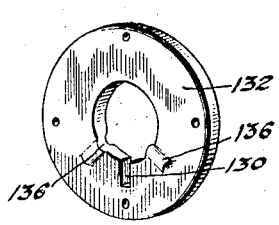
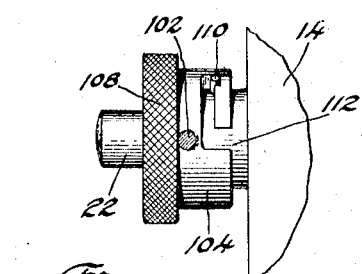

Patented Dec. 8, 1925.

1,564,514

UNITED STATES PATENT OFFICE.

LLOYD BLACKMORE, OF HIGHLAND PARK, MICHIGAN, ASSIGNOR TO GENERAL MOTORS CORPORATION, OF DETROIT, MICHIGAN, A CORPORATION OF DELAWARE.

WINDSHIELD CLEANER.

Application filed January 12, 1923. Serial No. 612,207.

*To all whom it may concern:*

Be it known that I, LLOYD BLACKMORE, a citizen of the United States, and a resident of Highland Park, county of Wayne, and State of Michigan, have invented certain new and useful Improvements in Windshield Cleaners, of which the following is a full, clear, concise, and exact description, such as will enable others skilled in the art to which the invention relates to make and use the same, reference being made therein to the accompanying drawings, which form a part of this specification.

This invention relates to windshield cleaners, and is illustrated as embodied in cleaners for automobile windshields of the type which is automatically operated by fluid power means through being connected to the intake manifold.

Windshield cleaners usually comprise a wiper including a strip of rubber or other suitable material, which rests against the windshield glass when the cleaner is not being used so that it soon becomes permanently deflected in one direction or the other. An object of the present invention is the avoidance of such permanent deflection or distortion of the material of the wiper, by separating the wiper from the glass when not in use so that the material may resume its original position. Preferably the wiper is locked out of engagement with the glass at one end of its stroke, above the driver's normal line of vision.

In the several illustrated embodiments of the invention, the wiper is carried by a power oscillated rock member, which is axially movable to separate the wiper from the glass, and which can be locked at one end of its stroke with the wiper so separated from the glass. In a form which is well adapted for manufacture in large quantities, a pair of co-axial rock members carrying co-operating clutch elements are connected respectively to the wiper and to a fluid operated piston, and means is provided for axially moving the rock member carrying the wiper, against the resistance of a spring which urges the wiper against the glass, and locking it with the wiper out of engagement with the glass and preferably out of the driver's normal line of vision.

Especially well adapted for use with the the above described construction, although not necessarily so limited, is a construction in which the power is cut off by axial movement of the wiper carrying rock member, as for example by closing a fluid controlling valve.

Another feature of the invention relates to an improved auxiliary clutch element for locking the wiper out of the driver's normal range of vision, whether or not the power is at the same time cut off, and whether or not the wiper is also locked out of engagement with the glass.

Other features of the invention, including provision for adjusting the tension of the spring holding the wiper against the glass, and other novel combinations and desirable specific constructions, will be apparent from the following description of several illustrative embodiments of the invention shown in the accompanying drawings, in which:

Fig. 6 is a view, partly in side elevation and partly in vertical section, of a further modified construction;

Fig. 7 is a similar view, partly in side elevation and partly in vertical section, of a third modified construction;

Fig. 8 is a perspective view of part of the wiper locking means of the modification shown in Fig. 7; and Fig. 9 is a side elevation of part of the wiper locking means of the modification shown in Fig. 6.

Figure 1:
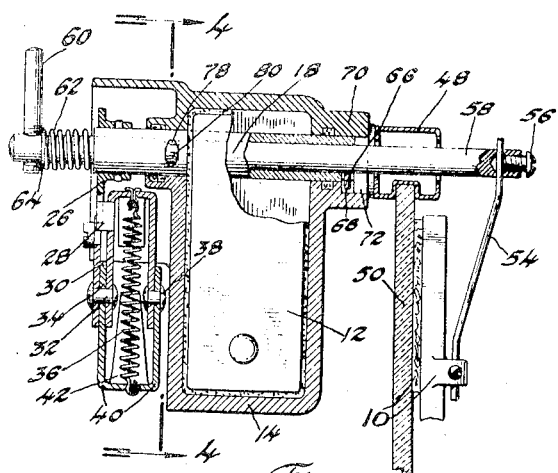
Fig. 1 is a vertical section through a cleaner mounted on a windshield.

In each of the several modifications, a wiper 10 is arranged to be operated by a fluid piston 12 arranged in a chamber in a casing 14, opposite ends of the chamber alternately being connected to the intake manifold or other source of power through a flexible coupling attached to a conduit 16. The end of the chamber in casing 14 which is not connected to the manifold is open to the atmosphere, so that the pressure of the atmosphere operates piston 12 on account of the partial vacuum in the intake manifold.

Piston 12 is connected to a rock member such as a sleeve 18 (Fig. 1) or 20 (Fig. 5), or a shaft 22, (Fig. 6), or 24 (Fig. 7), each carrying a two-arm pawl 26, the opposite arms of which alternately engage a projection 28 on a U-shaped lever 30 mounted on a fulcrum pin 32 carried by a cross-bar 34 secured to casing 14. Lever 30 is connected by a coil spring 36 with a three-arm lever mounted on pin 32 and a pin 38 carried by lever 30, the three-arm lever having a U-shaped arm 40 to which the spring is attached and which has lugs 42 forming with the U-shaped arm a cage for spring 36. The three arm lever also has a pair of oppositely extending L-shaped arms 44, of which the cross portions hook into notches in stems 46 of valves at opposite ends of casing 14. Each of these valves in its upper position, connects its end of the chamber in casing 14 with the atmosphere, and in its lower position connects it with conduit 16.

In the operation of the above described parts, which except as noted are the same in the various modifications, the swinging of piston 12 back and forth operates through pawl 26 to oscillate lever 30. During the first part of the oscillation of lever 30 and until it passes the position of alinement with U-shaped part 40 of the three arm lever, spring 36 is stretched somewhat, but holds the three arm lever in its initial position without changing the valves. As lever 30 passes the position of alinement with the U-shaped part 40 of the three arm lever, toward the end of its stroke, spring 36 suddenly swings the three arm lever to its opposite extreme position, reversing the valves and causing the piston 12 to be swung in the opposite direction for its next stroke.

Figure 2:
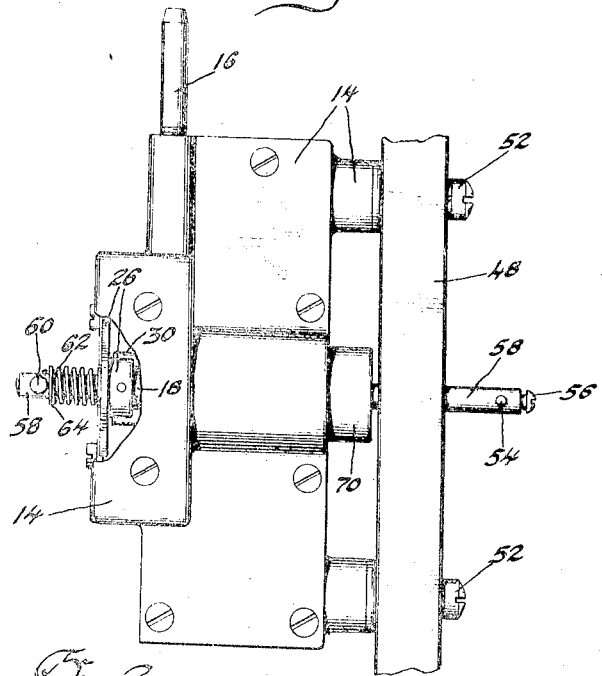
Fig. 2 is a top plan view thereof, partly broken away.
Figure 3:
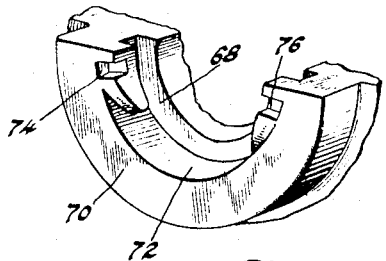
Fig. 3 is a perspective view, broken away, of part of the wiper locking means.

The cleaner is supported by attaching casing 14 to the frame 48 of a windshield glass 50, by means of tap screws 52 (Fig. 2)

In the form of the invention shown in Figs. 1–4, the wiper 10 is secured by an arm 54 held by a set screw 56 to a shaft 58 which is axially movable in a bearing formed by sleeve 18. A handle 60 is mounted on the opposite end of the shaft, to permit the driver to manipulate it manually, and a spring 62 engaging at one end a washer 64 held by the handle, and one end of sleeve 18 at the other end, urges shaft 58 axially through sleeve 18 to press wiper 10 against glass 50. This spring also serves to clutch the sleeve and shaft together, to cause the wiper to be operated by piston 12, there being a pair of clutch elements of the projection and notch type formed by mounting a pin 66 in the shaft and cutting a notch to receive it in the end of the sleeve. The end of this pin travels in a groove 68 formed in a boss 70 shown as integral with casing 14.

When the driver wishes to lock the wiper at one end of its stroke and out of engagement with the glass, as explained above, he grasps handle 60, (turns shaft 58 to a central position where the wiper is vertical), and pushes the shaft axially forward against the resistance of spring 62, such movement being permitted by reason of pin 66 being in registry with a wide notch or opening 72 through the flange of boss 70 which forms the front wall of groove 68. He then turns the shaft to its right or left limit of movement, where it is held with the wiper out of engagement with the glass by an auxiliary clutch element formed by cutting pin-receiving notches 74 and 76 in the front face of boss 70.

Figure 4:
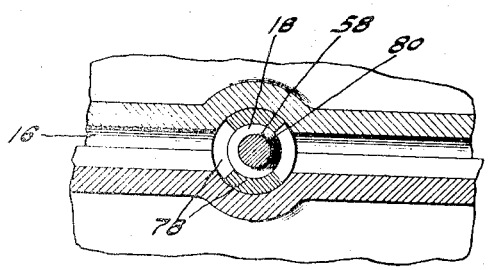
Fig. 4 is a section on the line 4—4 of Fig. 1, showing the fluid controlling valve.

According to another feature of the invention, axial movement of shaft 58 is utilized to open and close a fluid controlling valve which cuts off the power when the wiper is in idle position and turns it on when the wiper is in operative position. As shown in Figs. 1 and 4, this valve is formed by cutting openings 78 in opposite sides of sleeve 18 in alinement with conduit 16, and by cutting an annular groove 80 in shaft 58 which is in alinement with openings 78 and conduit 16 when the wiper is in operative position. When the wiper is in idle position, shaft 58 is pushed forward, groove 80 does not aline with openings 78, and the valve is closed. Openings 78 are long enough so that oscillation of sleeve 18 does not block the valve.

Figure 5:
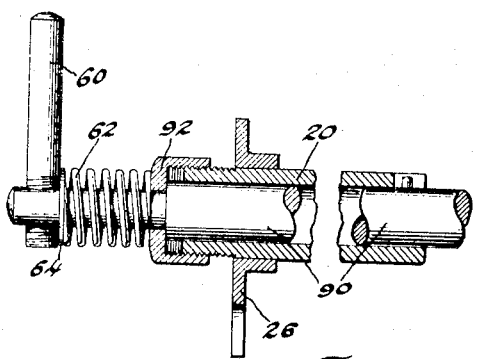
Fig. 5 is a view corresponding to part of Fig. 1, showing a modified construction.

The modification shown in Fig. 5 differs from that of Figs. 1–4 in that shaft 90, corresponding to shaft 58, is shouldered to engage a thimble 92 threaded on sleeve 20. By adjusting thimble 92 by turning it with respect to sleeve 20, the tension of spring 62, and consequently the pressure of the wiper on the glass, may be varied as desired.

In Figs. 6 and 9 is shown a modification in which the wiper is carried by a sleeve 100 which is axially movable on the reduced front end of shaft 22, the sleeve being formed with a projection and the shouldered part of the shaft with a notch to constitute the elements of a clutch as above explained. A pushrod 102 connects this sleeve with a locking member 104 having a handle 106 and a bayonet slot 108 embracing a pin 110 carried by a boss 112 of casing 14. A spring 114 engaging locking member 104 and boss 112 serves to urge the wiper against the glass, and to clutch sleeve 100 to shaft 22, unless restrained by pin 110 being in slot 108 as shown in Fig. 9.

In the modification shown in Figs. 7 and 8, the wiper is carried by a sleeve 120 normally clutched to shaft 24 by having in its end a notch embracing a pin 122 carried by the shaft. The sleeve may be manipulated by a handle or pushrod 124 connected thereto, against the resistance of a spring 126 corresponding to springs 62 and 114. The wiper is locked in idle position by a pin 128 carried by sleeve 120, which in a central position passes through a notch 130 in a plate 132 held in the end of a hollow boss 134, and which in either extreme position registers with one of two depressions 136, the backs of which are shown in Fig. 8.

While several modifications of my invention have been illustrated and described, it is not my intention to limit its scope thereby, or otherwise than by the terms of the appended claims. The term "wiper" is used throughout the specification and claims in a generic sense, and not by way of limitation to any particular type of cleaning or drying implement or the equivalent.

I claim:

1. A windshield cleaner comprising, in combination, a wiper for cleaning a windshield glass, a fluid pressure operated piston connected to said wiper for moving the wiper back and forth, a valve controlling the operation of said piston, a single device for moving the wiper away from the glass and to one end of its stroke and for closing the valve, and means for releasably holding the wiper in the position to which it is moved by said device.

2. A windshield cleaner comprising, in combination, a wiper for a windshield glass, an axially movable rock member carrying the wiper, fluid pressure operated piston means for rocking the member to operate the wiper, a projection and notch clutch connection between the rock member and said means, a piston controlling valve arranged to be operated by axial movement of the rock member, a spring acting axially of the rock member in a direction to urge the wiper against the glass and to hold the valve open, and an auxiliary part of a projection and notch clutch connection to hold said member against the resistance of the spring with the wiper out of engagement with the glass at one end of its stroke and with the valve closed.

3. A windshield cleaner comprising, in combination, a wiper for a windshield glass, an axially movable rock shaft to operate the wiper, a bearing for the shaft, fluid pressure controlled means to rock the shaft back and forth, and fluid connections for said means controlled by a valve consisting of alined openings in opposite sides of said bearing and an annular groove in the rock-shaft arranged to be moved into and out of registry with the openings by axial movement of the rock shaft.

4. A windshield cleaner comprising, in combination, a wiper, a wiper operating shaft movable axially to carry the wiper into and out of engagement with a windshield glass, fluid pressure operated means for operating the shaft, and a fluid controlling valve arranged to be opened and closed by axial movement of the shaft.

5. A windshield cleaner comprising, in combination, a wiper movable back and forth in engagement with a windshield glass, an axially movable rock member carrying the wiper, a fluid pressure operated piston connected to and operating the rock member, a spring acting on the rock member to urge the wiper against the glass, and a device to hold the rock member in an axially retracted position against the resistance of the spring with the wiper at one end of its stroke.

6. A windshield cleaner comprising, in combination, a wiper, a fluid pressure operated piston, a pair of rock members connected respectively to the piston and to the wiper, clutch elements carried respectively by the rock members, a spring acting on the rock members to urge the clutch elements together, and means for relatively moving the rock members to separate the clutch elements against the resistance of the spring and for holding them with the clutch elements separated and with the wiper at one end of its stroke.

7. A windshield cleaner comprising, in combination, a wiper, a fluid pressure operated piston, a pair of rock members connected respectively to the piston and to the wiper, projection and notch clutch elements carried respectively by the rock members, a spring acting on the rock members to urge the clutch elements together, and an auxiliary clutch element to hold the rock members with the first clutch elements separated against the resistance of the spring and with the wiper at one end of its stroke.

8. A windshield cleaner comprising, in combination, a wiper, a shaft carrying the wiper and arranged to oscillate to move it back and forth in engagement with a windshield glass, a fluid pressure oscillated sleeve surrounding and clutched to the shaft, a spring urging the shaft axially through the sleeve into clutch position in a manner to press the wiper against the glass, and an auxiliary element to hold the shaft in unclutched position against the resistance of the spring with the wiper out of engagement with the glass.

9. A windshield cleaner comprising, in combination, a wiper, a fluid pressure operated piston, co-axial rock members connected respectively to the wiper and the piston, clutch elements carried respectively by said rock members, a spring acting on the rock members to hold the wiper against the glass with the elements in clutching engagement, means for moving the wiper and its rock member axially of said member to an idle position with the clutch elements separated and with the wiper away from the glass, and an auxiliary element to hold the wiper and its rock member in said idle position.

In testimony whereof I affix my signature.

LLOYD BLACKMORE.